(12) United States Patent
Grace

(10) Patent No.: US 6,411,252 B1
(45) Date of Patent: Jun. 25, 2002

(54) NARROW BAND MILLIMETER WAVE VNA FOR TESTING AUTOMOTIVE COLLISION AVOIDANCE RADAR COMPONENTS

(75) Inventor: Martin I. Grace, San Jose, CA (US)

(73) Assignee: Anritsu Company, Morgan Hill, CA (US)

(*) Notice: Subject to any disclaimer, the term of this patent is extended or adjusted under 35 U.S.C. 154(b) by 0 days.

(21) Appl. No.: 09/344,416

(22) Filed: Jun. 25, 1999

(51) Int. Cl.[7] .............................. G01S 7/40; G01S 13/93
(52) U.S. Cl. .................... 342/174; 342/70; 342/165; 342/173; 342/195
(58) Field of Search .................... 342/27, 28, 29, 342/41, 165–175, 195, 109, 128, 70, 71, 72; 324/76.15, 76.29, 76.54

(56) References Cited

U.S. PATENT DOCUMENTS

| | | | | |
|---|---|---|---|---|
| 3,723,870 A | * | 3/1973 | Donahue | 324/76.54 |
| 3,745,579 A | * | 7/1973 | Lott | 342/171 |
| 3,831,088 A | * | 8/1974 | Ort et al. | 324/76.29 |
| 3,832,712 A | * | 8/1974 | Goetz et al. | 342/168 |
| 3,860,925 A | * | 1/1975 | Darboven, Jr. | 342/109 |
| 3,924,341 A | * | 12/1975 | Edelsohn | 342/171 |
| 4,209,786 A | * | 6/1980 | Barley et al. | 324/76.15 |
| 4,435,712 A | * | 3/1984 | Kipp | 342/128 |
| 4,477,811 A | * | 10/1984 | Collins, IV | 342/173 |
| 4,660,041 A | * | 4/1987 | Maples et al. | 342/170 |
| 4,679,049 A | * | 7/1987 | Riffiod | 342/172 |
| 4,686,534 A | * | 8/1987 | Eddy | 342/165 |
| 4,970,519 A | * | 11/1990 | Minnis et al. | 342/165 |
| 4,972,192 A | * | 11/1990 | Bruder | 342/171 X |
| 5,111,208 A | * | 5/1992 | Lopez | 342/174 |
| 5,138,325 A | * | 8/1992 | Koury | 342/169 |
| 5,164,734 A | * | 11/1992 | Fredericks et al. | 342/172 |
| 5,181,036 A | * | 1/1993 | Miler et al. | 342/172 X |
| 5,223,840 A | * | 6/1993 | Cronyn | 342/170 |
| 5,351,054 A | * | 9/1994 | Fredericks et al. | 342/172 |
| 5,384,572 A | * | 1/1995 | Michaels et al. | 342/169 |
| 5,546,090 A | * | 8/1996 | Roy, III et al. | 342/174 |
| 5,677,696 A | * | 10/1997 | Silverstein et al. | 342/174 X |
| 5,920,281 A | * | 7/1999 | Grace | 342/165 |

* cited by examiner

Primary Examiner—Bernarr E. Gregory
(74) Attorney, Agent, or Firm—Fliesler, Dubb, Meyer & Lovejoy, LLP

(57) ABSTRACT

A test system is provided operating in the 76–77 GHz range for testing components of a collision avoidance radar system. The system uses a Scorpion vector network analyzer (VNA) having an internal stimulus source synthesizer operating over a narrow 3–6 GHz range. The source signal from the Scorpion VNA is up-converted in a test module to a 75–78 GHz signal, without using a non-linear multiplier between the Scorpion VNA source and a device under test (DUT). A 72 GHz. local oscillator (LO) signal is provided for up-conversion as well as down-conversion using a dielectric resonator oscillator (DRO) phase-locked to a crystal oscillator of the Scorpion VNA. The DRO is included internal,to the test module. Fundamental up-conversion and down-conversion is provided in the test system so that significant conversion losses do not occur, as when higher order harmonics are used.

29 Claims, 3 Drawing Sheets

NARROW BAND MILLIMETER WAVE VNA FOR TESTING AUTOMOTIVE COLLISION AVOIDANCE RADAR COMPONENTS

BACKGROUND OF THE INVENTION

1. Field of the Invention

This invention relates to a device for testing the performance accuracy of components in an automotive collision avoidance radar system.

2. Description of the Related Art

A collision avoidance radar operates by transmitting a signal from an antenna typically located in the grill area of an automobile. The collision avoidance radar then determines from a return signal received a distance an object is located from an automobile and a rate the object causing the return signal is moving relative to the automobile.

Collision avoidance radars in the United States are configured to operate within a narrow band millimeter frequency range of 76–77 GHz allocated by the Federal Communications Commission (FCC). To assure proper performance of a collision avoidance radar system, testing is periodically performed to assure components of the system are operating within the 76–77 GHz range specified by the FCC. Testing is further periodically performed to assure that the system is radiating adequate power and to pinpoint components which are not functioning properly if the system is not providing adequate power, or operating outside desired frequency ranges. Such testing is typically performed using a vector network analyzer (VNA).

Components typically used in a VNA setup to make measurements in the 76–77 GHz range are shown in FIG. 1. The typical VNA illustrated includes an external millimeter wave reflectometer 110 whose stimulus is provided from a signal synthesizer 100 located external to the reflectometer 110. The local oscillator (LO) input to the reflectometer 110 is provided from a tunable synthesizer 112, also located separate from the reflectometer 110. VNAs that include components to make measurements in the millimeter range, as shown in FIG. 1, include the ANRITSU™ 37000 and ANRITSU™ 360 series VNAs manufactured by Anritsu Company of Morgan Hill Calif. Other VNAs having components shown in FIG. 1 include the HP 8510m series VNAs manufactured by Hewlett Packard.

The reflectometer 110 includes millimeter wave multipliers 102 and 104 providing the signal from the synthesizer 100 to a device under test (DUT) 104. The multipliers 102 and 104 multiply the frequency of a signal from the synthesizer by a factor of four or more to achieve a 76–77 GHz output. The DUT 104 is connected to the reflectometer 110 using WR-12 wave guide forming test ports 106 and 107 to provide the 76–77 GHz output. The synthesizer 100 is connected to the reflectometer 110 using coaxial connectors. Amplifiers, isolators, attenuators, and couplers are further provided in the path between the coaxial connector inputs and WR-12 waveguide test ports 106 and 107, as shown in FIG. 1.

Intermediate Frequency (IF) output signals are provided from the reflectometer 110 using superheterodyne harmonic millimeter wave mixers 121–124. The LO signal from synthesizer 112 is provided to one input of each of the mixers 121–124 through amplifiers, isolators, and power dividers as shown in FIG. 1. The IF signals from the mixers 121–124 are provided back to a VNA for further down-conversion and processing.

The couplers 131–134 provide a second input to each one of the mixers 121–124. Couplers 131 and 133 couple an incident signal traveling from multipliers 102 and 104 to mixers 121 and 123. Couplers 132 and 134 couple signals reflected from the DUT 104 or transmitted through the DUT 104 to the mixers 122 and 124.

The performance of the system shown in FIG. 1 is limited in several ways. First, the frequency switching time for the synthesizer 100 is typically slow (~5 to 15 milliseconds). The slow switching speed is due to high resolution available over a broad bandwidth of signals typically provided from the instrument grade synthesizer 100. Second, the nonlinearity of multipliers 102 and 104 prevent the signal provided to the test ports 106 and 107 from having a flat output power as a function of frequency. Third, a harmonic higher than the first order is typically required from harmonic mixers 121–124 so that a lower frequency LO signal from the LO synthesizer 112 can achieve a desired IF output frequency. Using a higher order harmonic from the mixers 121–124 results in a significant conversion loss. Fourth, the cost of instrument grade synthesizers typically used for the stimulus synthesizer 100 and local oscillator synthesizer 112 in a VNA can be excessive.

SUMMARY OF THE INVENTION

The present invention provides a test system used with a stimulus synthesizer operating over a narrow frequency range. With a narrow bandwidth stimulus synthesizer, frequency switching time can be increased. Further, the cost of the stimulus synthesizer can be reduced relative to a broadband instrument grade synthesizer. Further, a synthesizer referenced to the stimulus synthesizer can be used to provide the LO with a significant cost reduction over an instrument grade LO synthesizer.

The present invention further provides a test signal from the stimulus synthesizer to a DUT without an intervening multiplier, enabling a flat power output as a function of frequency.

The present invention further uses a fundamental or a first harmonic for all up-conversions and down-conversions so conversion losses can be avoided.

The present invention is a test system including a narrowband SCORPION™ VNA manufactured by Anritsu Company, a dielectric resonator oscillator (DRO) for providing a LO signal, and a test module.

The Scorpion VNA includes a stimulus synthesizer producing a test signal ranging from 3 GHz to 6 GHz to selectively provide at two input ports of the test module. The Scorpion VNA further receives 3 to 6 GHz IF output signals from the test module and down-converts these signals to provide to a DSP.

The test module includes linear up-converters to translate the 3 to 6 GHz output signal from the Scorpion VNA to provide signals in a 75–78 GHz range to test ports of the test module. The test module avoids multipliers between the VNA and test ports of the test module to create a flat output power vs. frequency signal.

The DRO for providing the LO signal produces a 18 GHz output phase locked to the Scorpion VNA crystal oscillator. The 18 GHz is multiplied times four to 72 GHz. The 72 GHz Lo is used to up-convert the 3 to 6 GHz output of the Scorpion system to a 75 to 78 GHz frequency band. Down-converters further use the 72 GHz LO to translate the 75 to 78 GHz signal from the test module to IF signals in the 3 to 6 GHz range to be detected and measured by the Scorpion VNA.

BRIEF DESCRIPTION OF THE DRAWINGS

Further details of the present invention are explained with the help of the attached drawings in which.

DETAILED DESCRIPTION

Figure 2:
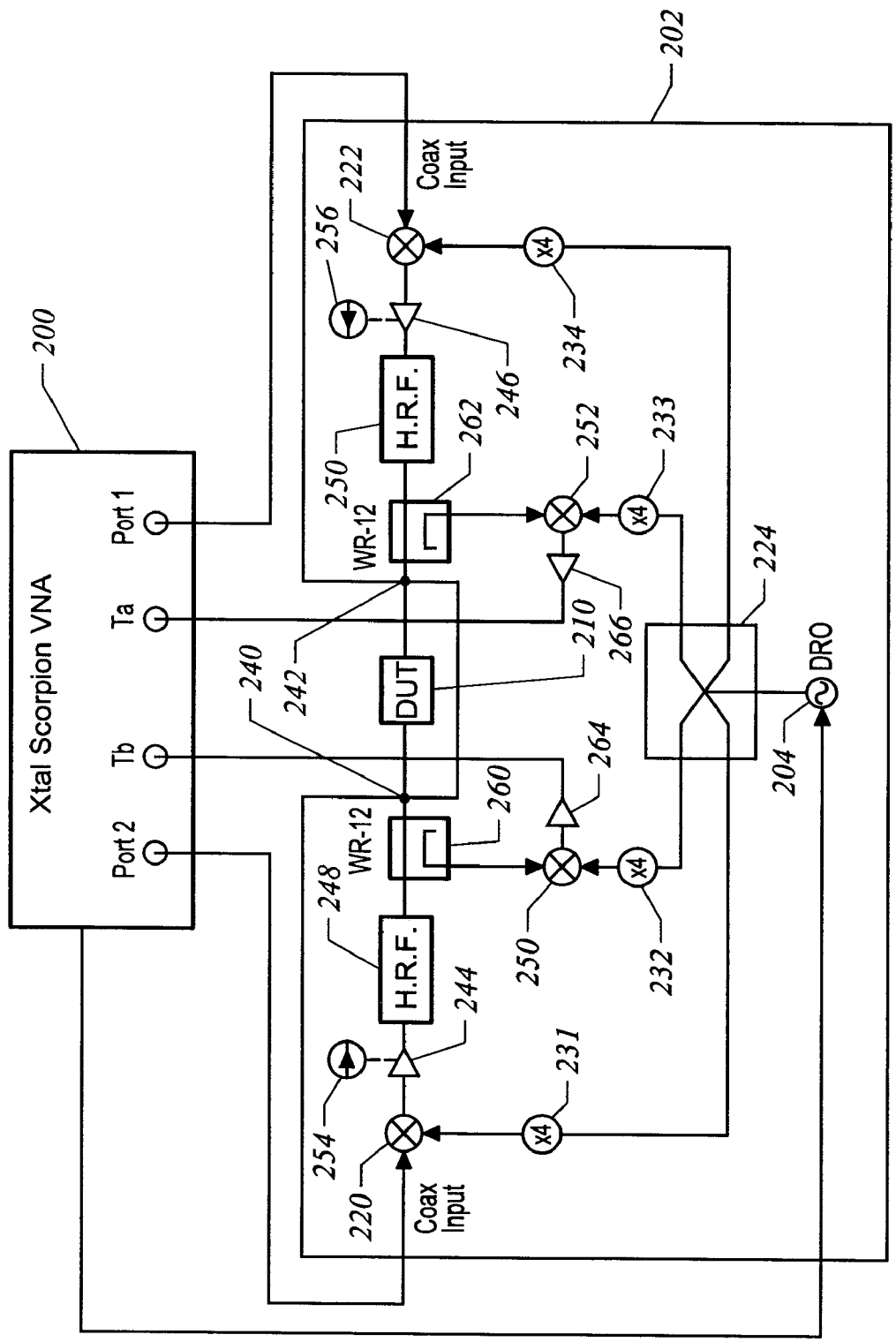
FIG. 2 shows components for a test system of the present invention.

FIG. 2 shows components of a test system for the present invention. As shown, the system includes a Scorpion VNA 200 having a port 1 and port 2 for 20 providing signals to a test module 202. The test module 202 includes connections to provide return IF signals to terminals Ta or Tb of the Scorpion VNA. A crystal oscillator frequency reference connection (Xtal) from the Scorpion VNA 200 is provided to a dielectric resonator oscillator (DRO). The DRO 204 is used to provide a local oscillator (LO) signal to the test module 202.

Figure 3:
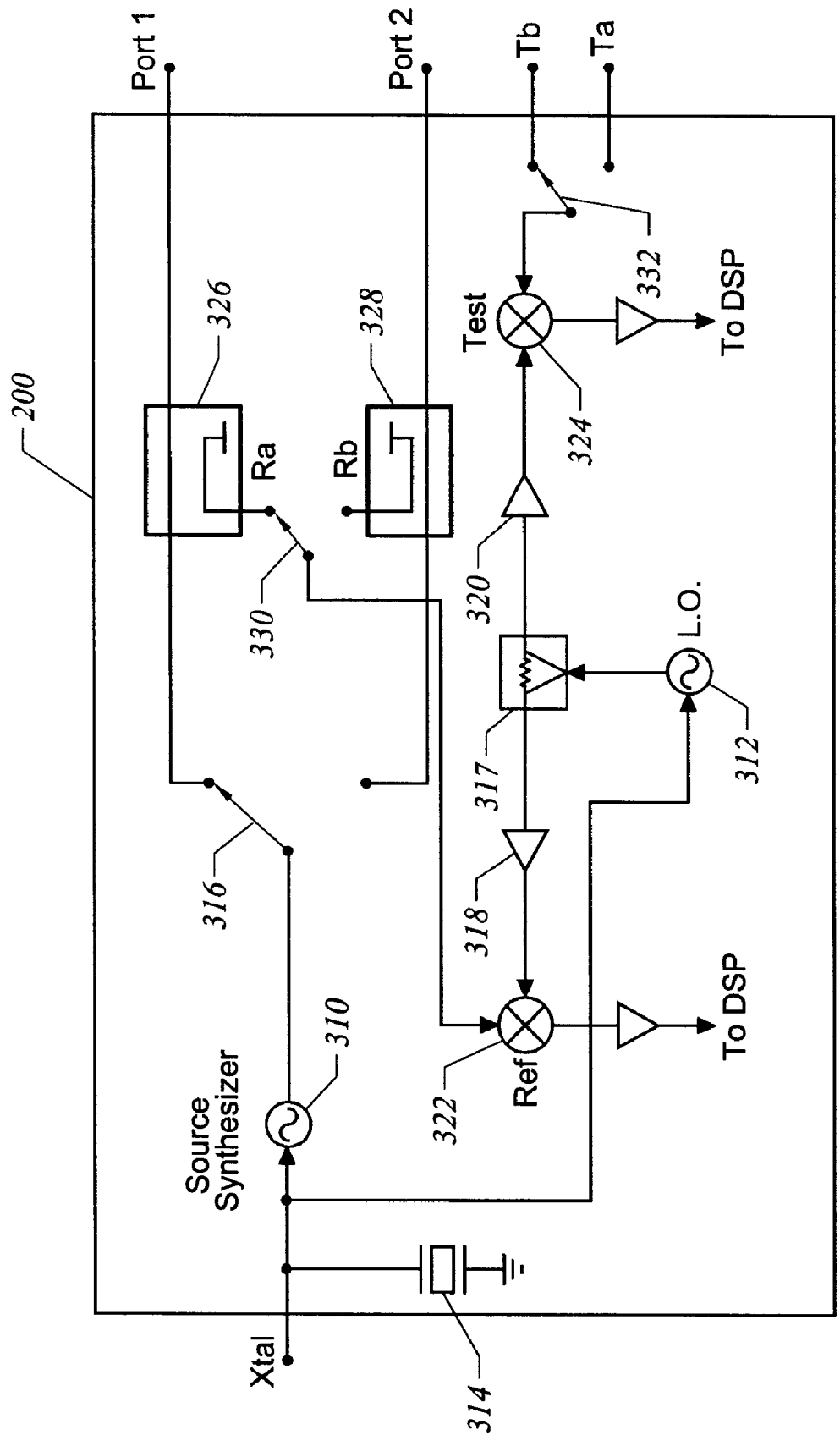
FIG. 3 shows components of the Scorpion VNA of FIG. 2.

FIG. 3 shows components included in the Scorpion VNA of FIG. 2. The Scorpion VNA 200 includes an internal stimulus synthesizer source 310 and a local oscillator 312 which are both referenced to a crystal oscillator 314. The crystal oscillator 314 is also connected to the frequency reference terminal (Xtal) on the Scorpion VNA 200. In one embodiment, the crystal oscillator 314 operates at 10 MHz and the source synthesizer 310 which is phase locked to the 10 MHz reference provides a 3 to 6 GHz test signal. The switching speed of the Scorpion synthesizer 310 is on the order of 250 microseconds, which is at least 20 times faster than a typical tunable instrument grade synthesizer.

The test signal from the synthesizer 310 is selectively provided to one of port 1 or port 2 of the scorpion VNA 200 by a transfer switch 316. A signal returned from the test module 202 is provided to the Scorpion VNA 200 through one of terminals Ta and Tb.

A switch 330 works in conjunction with the transfer switch 316 to connect the through path of one of couplers 326 and 328 to a first input of a mixer 322. The couplers 326 and 328 serve to couple a reference signal (Ref) from the source synthesizer 310 to a first input of a mixer 322.

A switch 332 selectively connects the terminals Ta and Tb to a first input of mixer 324. The signal provided to the test port Ta or Tb is a 3 to 6 GHz signal returned from test module 202. The 3 to 6 GHz signal returned from the test module 202 is a signal down-converted in the test module from a 75 to 78 GHz signal reflected from a DUT 210 connected to the test module. The 75 to 78 GHz signal provided to the DUT 210 is generated in the test module from up-conversion of the 3 to 6 GHz signal provided from port 1 or port 2 of the Scorpion VNA. The signal provided to terminal Ta or Tb from the test module 202 is a test signal (Test).

The signal from the local oscillator 312 is a 3 to 6 GHz signal provided to mixers 322 and 324 through a power divider 317 and amplifiers 318 and 320. The mixer 322 down-converts the reference (Ref) signal for processing by a DSP, while the mixer 324 down-converts the test signal (Test) for processing by the DSP. The DSP of the Scorpion VNA processes the (Ref) and (Test) signals to provide S-parameter measurements for the DUT 210. By selectively controlling the switches 316, 330 and 332, S-parameters $S_{12}$ and $S_{21}$ for DUT 210, requiring through measurements, can be made as well as S-parameters $S_{11}$ and $S_{22}$, requiring reflection type measurements.

Figure 1:
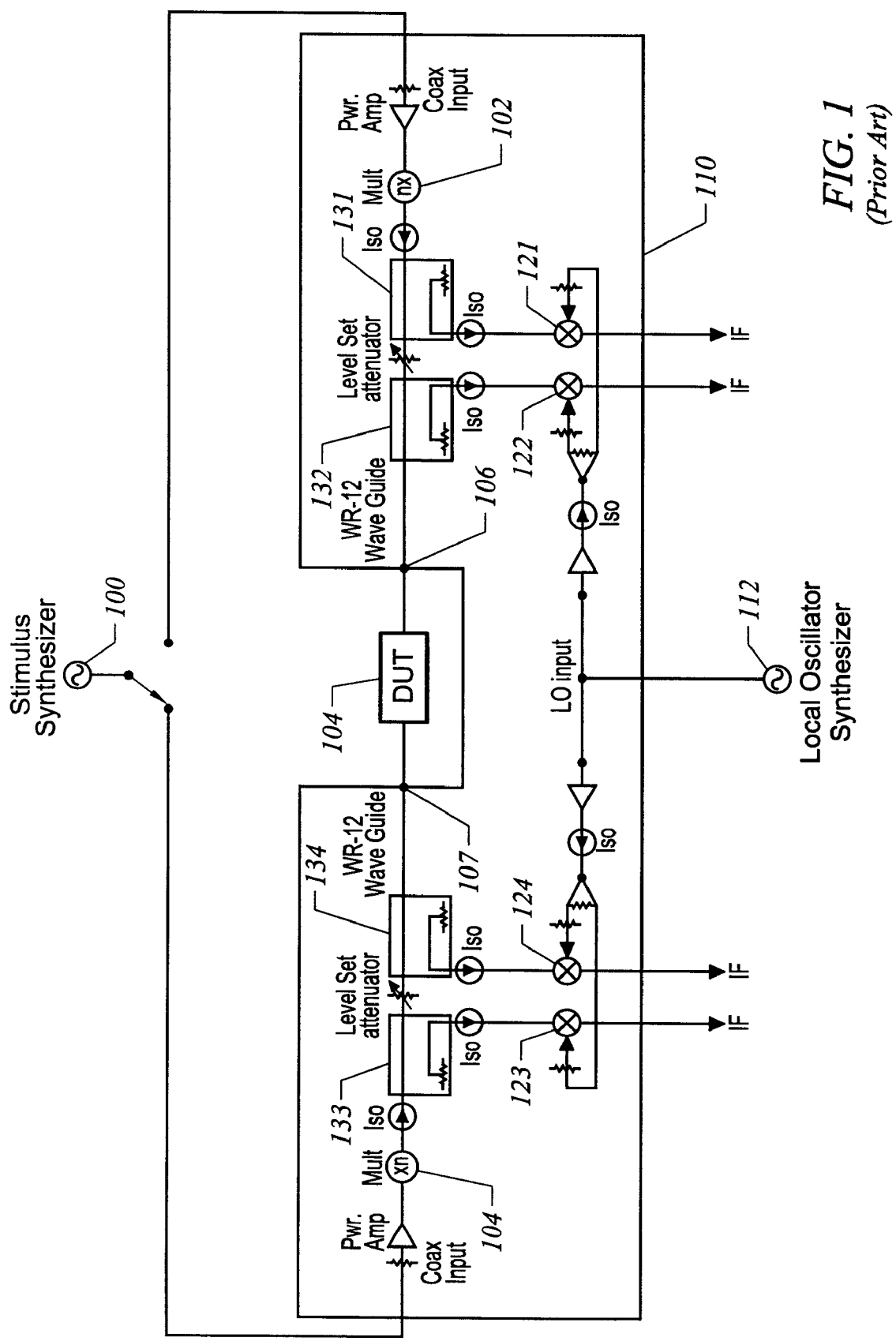
FIG. 1 shows typical components of a VNA for testing components operating in the 76–77 GHz range.

Referring back to FIG. 2, the test module 202 includes coaxial type input connectors for connecting to mixers 220 and 222. The mixers 220 and 222 up-convert the 3 to 6 GHz signal from port 1 or port 2 of the scorpion VNA 200 to a 75 to 78 GHz signal for providing to the DUT 210. To provide such up-conversion, so that non-linear multipliers are not required in the path between the Scorpion VNA 200 and the DUT 210, a LO signal is provided to a second input of the mixers 220 and 222 at 72 GHz. With non-linear multipliers between the source synthesizer and DUT as shown in the system of FIG. 1 removed, the present invention can provide a signal to a DUT having a flat output power as a function of frequency.

To provide the 72 GHz LO signal, the DRO 204 in this embodiment operates at the fourth subharmonic 18 GHz. The DRO is phase locked to the 10 MHz crystal oscillator reference 314 of the Scorpion VNA 200. The DRO provides a significant cost reduction from an instrument grade synthesizer typically used for the LO, particularly for a LO synthesizer operating near 72 GHz. The DRO has a small size and can be included internal to the test module 202, as opposed to being a large separate device more typical of instrument grade synthesizers.

The output of the DRO 204 is provided through a four way power divider to four times four multipliers 231–234. The outputs of the multipliers 231–234, thus, each provide a 72 GHz LO signal. The output of multiplier 231 forms the second input of mixer 220, while the output of multiplier 234 forms the second input of mixer 222.

With the 72 GHz LO mixed with the 3 to 6 GHz RF signal from the Scorpion VNA 200, a 75 to 78 GHz signal is output from the mixers 220 and 222 to WR-12 wave guide connectors forming test ports 240 and 242. An arbitrary DUT 210 is connected at test ports 240 and 242 for measurement by the system of the present invention. Amplifiers 244 and 246 boost the power of the up-converted signal from mixers 220 and 222 to provide to the test ports 240 and 242. Although amplifiers 244 and 246 are shown, isolators 254 and 256 may be substituted for the amplifiers 244 and 246 within the scope of the present invention.

A coupler 260 is included in the path between the test port 240 and mixer 220 to couple a signal reflected from the DUT 210 to a first input of mixer 250. A coupler 262 is included between the test port 242 and mixer 222 to couple a signal reflected from the DUT 210 to a first input of mixer 252. A second input of mixer 250 receives a 72 GHz signal from multiplier 232, while a second input of mixer 252 receives a 72 GHz signal from multiplier 233. Mixers 250 and 252, then, serve to down-convert the 75–78 GHz signal from the DUT to a 3–6 GHz return signal for providing to the terminals Ta and Tb of the Scorpion VNA 200. The outputs of the mixers 250 and 252 are provided through amplifiers 264 and 266 and coaxial connectors for connection to the terminals Ta and Tb of the Scorpion VNA 200. Although amplifiers 264 and 266 are shown, isolators may replace the amplifiers 264 and 266 within the scope of the present invention.

A high pass filter 248 is provided between the output of mixer 220 and coupler 260 to remove lower sideband components from the output of mixer 220. A similar high pass filter 250 may be provided between the output of mixer 222 and the input of coupler 262. With a 3–6 Hz signal as a first input to mixers 220 and 222, and a 72 GHz signal LO signal as a second input from multipliers 231 and 234, the upper sideband output component from mixers 220 and 222 will range from 75–78 GHz, while the lower sideband output component will range from 66–69 GHz. The lower sideband signals generated in mixers 220 and 222 are demodulated as spurious signals from mixers 250 and 252.

The present invention as shown in FIGS. 2 and 3 includes multiple fundamental up-conversions and down-conversions. With only the first harmonic required for up-conversion or down-conversion in the mixers, no significant conversion loss occurs as with the system of FIG. 1.

Although the invention has been described above with particularity, this was merely to teach one of ordinary skill in the art how to make and use the invention. Many modifications will fall within the scope of the invention, as that scope is defined by the claims which follow. For example, the frequency range of collision avoidance radar systems might be altered from the 76–77 GHz allocated by the FCC, particularly for systems used outside the United States. As such, the frequency output range for the test system might be altered from the 75–78 GHz range, discussed above, by changing the 3 to 6 GHz range provided from the source synthesizer, or by changing the LO frequency from 72 GHz.

What is claimed is:

1. A method for testing a device under test (DUT) comprising the steps of:
    generating a first signal with a first range of frequencies;
    upconverting the first signal to a second signal with a substantially linear power versus frequency change;
    providing the second signal to the DUT;
    receiving a third signal from the DUT created from the second signal;
    downconverting the third signal to a fourth signal with a substantially linear power versus frequency change; and
    downconverting the first signal and the fourth signal to determine S parameters for the DUT.

2. A test system for testing a device under test (DUT), the system comprising:
    a Vector Network Analyzer (VNA) having a first test port for providing a first signal, and having a first return signal terminal;
    a first up-converter having an input coupled to the first test port of the VNA for receiving the first signal, and an output coupled to a first DUT connection port for providing a second signal upconverted from the first signal with a substantially linear power versus frequency change;
    a first coupler having a through path connecting the output of the first up-coverter to a first DUT connection port for coupling the second signal to a DUT, and a coupling port for coupling a third signal reflected from the first DUT connection port to an output terminal of the first coupler, the third signal being created from the second signal; and
    a first down-converter having an input coupled to the output of the first coupler for receiving a third signal, and an output coupled to the first return signal terminal of the VNA, the output of the first down converter for providing a fourth signal downconverted from the third signal with a substantially linear power versus frequency change, the fourth signal having a frequency range substantially the same as the first signal.

3. The test system of claim 2 further comprising:
    a first oscillator having an output providing a signal having a frequency phase locked with the first signal from the first test port of the VNA;
    a power divider having an input coupled to the output of the first oscillator, a first output and a second output;
    a first multiplier having an input coupled to the first output of the power divider, and having an output coupled to a second input of the first up-converter;
    a second multiplier having an input coupled to the second output of the power divider, and having an output coupled to a second input of the first down-converter.

4. The test system of claim 2, wherein the VNA comprises:
    a crystal oscillator;
    a signal source having an input coupled to the crystal oscillator and an output providing the first signal phase locked with a signal from the crystal oscillator;
    a first VNA coupler having a through path for connecting the output of the signal source to the first test port and having a coupling path for coupling the output of the signal source to a first VNA coupler output;
    a first VNA down-converter having an input coupled to the output of the first VNA coupler, and an output providing a reference signal from the VNA; and
    a second VNA down-converter having an input coupled to the first return signal terminal of the VNA, and an output providing a test signal from the VNA.

5. The test system of claim 4, wherein the first oscillator is a dielectric resonator oscillator (DRO) which has an input coupled to the crystal oscillator of the VNA, and wherein the output of the DRO provides a signal phase locked to the frequency of the crystal oscillator.

6. The test system of claim 4, further comprising:
    a digital signal processor (DSP) having a first input coupled to the output of the first VNA down-converter, and a second input coupled to the output of the second VNA down-converter, the processor for determining S parameters for a DUT connected to the first DUT connection port.

7. The test system of claim 2, further comprising:
    a filter connecting the output of the first up-converter to the through path of the first coupler.

8. The test system of claim 2, further comprising:
    an isolator connecting the output of the first up-converter to the through path of the first coupler.

9. The test system of claim 2, wherein the VNA further includes a second test port for providing the first test signal, and a second return signal terminal, and wherein the test system further comprises:
    a second up-converter having a first input coupled to the second test port of the VNA for receiving the first signal, and an output coupled to a first DUT connection port for providing the second signal upconverted from the first signal with a substantially linear power versus frequency change;
    a second coupler having a through path connecting the output of the second up-converter to a second DUT connection port for coupling the second signal to a DUT, and a coupling port for coupling the third signal as provided from the second DUT connection port to an output of the second coupler;
    a second down-converter having a first input coupled to the output of the second coupler for receiving the third signal, and an output coupled to the first return signal terminal of the VNA, the output of the second down converter providing the fourth signal downconverted from the third signal with a substantially linear power versus frequency change.

10. The test system of claim 9, wherein the VNA comprises:
    a crystal oscillator;
    a signal source having an input coupled to the crystal oscillator and an output providing the first signal phase locked with a signal from the crystal oscillator;

a first switch for selectively coupling the output of the signal source to a first output and a second output;

a first VNA coupler having a through path connecting the first output of the first switch to the first test port, and having a coupling path coupling the output of the signal source to an output terminal of the first VNA coupler;

a second VNA coupler having a through path connecting the second output of the first switch to the second test port, and having a coupling path coupling the output of the signal source to an output terminal of the second VNA coupler;

a local oscillator;

a first VNA down-converter having a first input coupled to the local oscillator, a second input, and an output providing a reference signal;

a second switch having a first terminal coupled to the second input of the first VNA down-converter, a second terminal coupled to the output of the first VNA coupler, and a third terminal coupled to the output of the second VNA coupler, wherein the second switch selectively connects its first terminal to one of its second and third terminals;

a second VNA down-converter having a first input coupled to the local oscillator, a second input, and an output providing a test signal;

a third switch having a first terminal coupled to the second input of the second VNA down-converter, a second terminal coupled to the first return signal terminal, and a third terminal coupled to the output of the second return signal terminal, wherein the third switch selectively connects its first terminal to one of its second and third terminals.

11. The test system of claim 10, further comprising:

a processor having a first input coupled to the output of the first VNA down-converter, and having a second input coupled to the output of the second VNA down-converter, the processor for determining S parameters for a DUT connected between the first and second DUT connection ports.

12. The test system of claim 9 further comprising:

a first oscillator having an output providing a signal having a frequency phase locked with the first signal from the first test port of the VNA;

a power divider having an input coupled to the output of the first oscillator, a first output, a second output, a third output, and a fourth output;

a first multiplier having an input coupled to the first output of the power divider, and having an output coupled to a second input of the first up-converter;

a second multiplier having an input coupled to the second output of the power divider, and having an output coupled to a second input of the first down-converter;

a third multiplier having an input coupled to the third output of the power divider, and having an output coupled to a second input of the second up-converter; and a fourth multiplier having an input coupled to the fourth output of the power divider, and having an output coupled to a second input of the second down-converter.

13. The test system of claim 9, further comprising:

a first isolator connecting the output of the first up-converter to the through path of the first coupler; and a second isolator connecting the output of the set up-converter to the through path of the second coupler.

14. The test system of claim 9, further comprising:

a first filter coupling the output of the first up-converter to the through path of the first coupler; and a second filter coupling the output of the second up-converter to the through path of the second coupler.

15. A test system for testing a device under test (DUT), the system comprising:

a Vector Network Analyzer (VNA) having a first test port for providing a test signal, and having a first return signal terminal;

a first oscillator having an output providing a signal having a frequency phase locked with the test signal;

a power divider having an input coupled to the output of the first oscillator, a first output and a second output;

a first multiplier having an input coupled to the first output of the power divider, and having an output;

a second multiplier having an input coupled to the second output of the power divider, and having an output;

a first up-converter having a first input coupled to the first test port of the VNA, a second input coupled to the output of the first multiplier, and having an output;

a first coupler having a through path connecting the output of the first up-converter to a first DUT connection port, and having an output terminal for coupling a signal from the first DUT connection port; and a first down-converter having a first input coupled to the output of the first coupler, a second input coupled to the output of the second multiplier, and an output coupled to the first return signal terminal of the VNA.

16. The test system of claim 15, wherein the first test port of the VNA is coupled to the first DUT connection port without an intervening multiplier.

17. The test system of claim 15, wherein a signal from the output of the second multiplier has a frequency set so that the first down-converter down-converts a first harmonic of a signal from the output of the first up-converter to provide a signal to the first return signal terminal of the VNA.

18. The test system of claim 15, wherein the first multiplier and the second multiplier multiply frequency by substantially the same amount.

19. The test system of claim 15, wherein the VNA comprises:

a crystal oscillator;

a signal source having an input coupled to the crystal oscillator and an output providing a signal phase locked with a signal from the crystal oscillator;

a first VNA coupler having a through path for connecting the output of the signal source to the first test port, and having a coupling path for coupling the output of the signal source to a first VNA coupler output;

a first VNA down-converter having an input coupled to the output of the first VNA coupler, and an output providing a reference signal from the VNA; and a second VNA down-converter having an input coupled to the first return signal terminal of the VNA, and an output providing a test signal from the VNA.

20. The test system of claim 19 wherein the first oscillator is a dielectric resonator oscillator (DRO) which has an input coupled to the crystal oscillator of the VNA, and wherein the output of the DRO provides a signal phase locked to the frequency of the crystal oscillator.

21. The test system of claim 15, further comprising:
a filter connecting the output of the first up-converter to the through path of the first coupler.

22. The test system of claim 15, wherein the VNA further includes a second test port for providing a test signal, and a second return signal terminal, and wherein the test system further comprises:
a third multiplier having an input coupled to a third output of the power divider, and having an output;
a fourth multiplier having an input coupled to a fourth output of the power divider, and having an output;
a second up-converter having a first input coupled to the second test port of the VNA, a second input coupled to the output of the third multiplier, and an output;
a second coupler having a through path connecting the output of the first up-converter to a second DUT connection port, and a coupling path for coupling a signal provided from the second DUT connection port to an output terminal of the second coupler;
a second down-converter having a first input coupled to the output of the second coupler, a second input coupled to the output of the fourth multiplier, and an output coupled to a second return signal terminal of the VNA.

23. The test system of claim 22, wherein the VNA comprises:
a crystal oscillator;
a signal source having an input coupled to the crystal oscillator, and having an output;
a first switch for selectively coupling the output of the signal source to a first output and a second output;
a first VNA coupler having a through path connecting the first output of the first switch to the first test port, and having coupling path coupling the signal source to an output terminal of the first VNA coupler;
a second VNA coupler having a through path connecting the second output of the first switch to the second test port, and having a coupling path coupling the signal source to an output terminal of the second VNA coupler;
a local oscillator;
a first VNA down-converter having a first input coupled to the local oscillator, a second input, and an output providing a reference signal;
a second switch having a first terminal coupled to the second input of the first VNA down-converter, a second terminal coupled to the output of the first VNA coupler, and a third terminal coupled to the output of the second VNA coupler, wherein the second switch selectively connects its first terminal to one of its second and third terminals;
a second VNA down-converter having a first input coupled to the local oscillator, a second input, and an output providing a test signal;
a third switch having a first terminal coupled to the second input of the second VNA down-converter, a second terminal coupled to the first return signal terminal, and a third terminal coupled to the output of the second return signal terminal, wherein the third switch selectively connects its first terminal to one of its second and third terminals.

24. The test system of claim 23, further comprising:
a processor with a first input coupled to the output of the first VNA down-converter, and a second input coupled to the output of the second VNA down-converter, the processor for determining S parameters for a DUT connected between the first and second DUT connection ports.

25. The test system of claim 15, further comprising:
a first filter connecting the output of the first up-converter to the through path of the first coupler; and
a second filter connecting the output of the second up-converter to the through path of the second coupler.

26. A test system comprising:
a Vector Network Analyzer (VNA) comprising:
a crystal oscillator;
a signal source having an input connected to the crystal oscillator and an output providing a signal phase locked with a signal from the crystal oscillator;
a first switch for selectively coupling the output of the signal source to a first output and a second output;
a first VNA coupler having a through path connecting the first output of the first switch to a first test port, and having a coupling path coupling the signal source output to an output terminal of the first VNA coupler;
a second VNA coupler having a through path connecting the second output of the first switch to a second test port, and having a coupling path coupling the signal source output to an output terminal of the second VNA coupler;
a local oscillator;
a first VNA down-converter having a first input coupled to the local oscillator, a second input, and an output providing a reference signal;
a second switch having a first terminal coupled to the second input of the first VNA down-converter, a second terminal coupled to the output of the first VNA coupler, and a third terminal coupled to the output of the second VNA coupler, wherein the second switch selectively connects its first terminal to one of its second and third terminals;
a second VNA down-converter having a first input coupled to the local oscillator, a second input, and an output providing a test signal; and
a third switch having a first terminal coupled to the second input of the second VNA down-converter, a second terminal coupled to the first return signal terminal, and a third terminal coupled to the second return signal terminal, wherein the third switch selectively connects its first terminal to one of its second and third terminals;
a test module comprising:
a dielectric resonator oscillator (DRO) having an input coupled to the crystal oscillator of the VNA, and an output providing a signal phase locked to a signal from the crystal oscillator;
a power divider having an input connected to the output of the DRO, and first, second, third, and fourth outputs;
a first multiplier having an input coupled to the first output of the power divider, and having an output;
a second multiplier having an input coupled to the second output of the power divider, and having an output;
a third multiplier having an input coupled to the third output of the power divider, and having an output;
a fourth multiplier having an input coupled to the fourth output of the power divider, and having an output;
a first up-converter having a first input coupled to the first test port of the VNA, a second input coupled to the output of the first multiplier, and having an output;

a first test module coupler having a through path coupling the output of the first up-converter to a first DUT connection port, and having a coupling path coupling the first DUT connection port to an output terminal of the first test module coupler;

a second up-converter having a first input coupled to the second test port of the VNA, a second input coupled to the output of the third multiplier, and having an output;

a second test module coupler having a through path coupling the output of the second up-converter to a second DUT connection port, and having a coupling path coupling the second DUT connection port to an output terminal of the second test module coupler;

a first down-converter having a first input coupled to the output of the first test module coupler, a second input coupled to the output of the second multiplier, and an output coupled to the first return signal terminal of the VNA; and a second down-converter having a first input coupled to the output of the second test module coupler, a second input coupled to the output of the fourth multiplier, and an output coupled to the second return signal terminal of the VNA.

27. The test system of claim 26, wherein the test module further comprises:

a first isolator coupling the output of the first up-converter to the first test module coupler; and a second isolator coupling the output of the second up-converter to the second test module coupler.

28. The test system of claim 26, wherein the test module further comprises:

a first filter coupling the output of the first up-converter to the first test module coupler; and a second filter coupling the output of the second up-converter to the second test module coupler.

29. The test system of claim 26 further comprising:

a digital signal processor (DSP) having a first,input coupled to the output of the first VNA down-converter, and a second input coupled to the output of the second VNA down-converter, the processor for determining S parameters for a DUT connected between the first and second DUT connection ports.

* * * * *